United States Patent
Miyazawa

(10) Patent No.: US 11,838,658 B2
(45) Date of Patent: Dec. 5, 2023

(54) IMAGING DEVICE CONTROLLING CORRECTION OF SUBJECT BLUR AND CONTROL METHOD FOR IMAGING DEVICE

(71) Applicant: CANON KABUSHIKI KAISHA, Tokyo (JP)

(72) Inventor: Hitoshi Miyazawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 265 days.

(21) Appl. No.: 17/214,539

(22) Filed: Mar. 26, 2021

(65) Prior Publication Data

US 2021/0314505 A1  Oct. 7, 2021

(30) Foreign Application Priority Data

Apr. 1, 2020 (JP) ................................ 2020-065610

(51) Int. Cl.
*H04N 25/60* (2023.01)
*H04N 23/617* (2023.01)
*H04N 23/63* (2023.01)
*H04N 23/68* (2023.01)

(52) U.S. Cl.
CPC .......... *H04N 25/60* (2023.01); *H04N 23/617* (2023.01); *H04N 23/632* (2023.01); *H04N 23/683* (2023.01)

(58) Field of Classification Search
None
See application file for complete search history.

(56) References Cited

U.S. PATENT DOCUMENTS

| 7,606,476 B2* | 10/2009 | Toji | H04N 23/611 |
| | | | 348/208.4 |
| 2012/0019678 A1* | 1/2012 | Fujita | H04N 23/667 |
| | | | 348/208.4 |
| 2015/0043786 A1* | 2/2015 | Ohki | H04N 23/6811 |
| | | | 382/107 |
| 2017/0223272 A1* | 8/2017 | Aoyama | H04N 23/6812 |
| 2018/0063436 A1* | 3/2018 | Miyazawa | H04N 23/69 |
| 2020/0145583 A1* | 5/2020 | Shanmugam | H04N 23/62 |
| 2021/0084226 A1* | 3/2021 | Yaguchi | H04N 23/959 |
| 2022/0417434 A1* | 12/2022 | Yasuda | H04N 23/6812 |

FOREIGN PATENT DOCUMENTS

JP  2018-180336 A  11/2018

* cited by examiner

*Primary Examiner* — Cynthia Segura
(74) *Attorney, Agent, or Firm* — CANON U.S.A., INC. IP Division

(57) ABSTRACT

A camera control unit detects a subject using a first method, detects a subject using a second method different from the first method, displays a candidate for a correction position at which subject blur is corrected on an LCD based on each of a detection result obtained using the first method and a detection result obtained using the second method. The camera control unit and a lens control unit perform control of correcting the subject blur by driving a shift lens based on a correction position specified from among candidates.

20 Claims, 10 Drawing Sheets

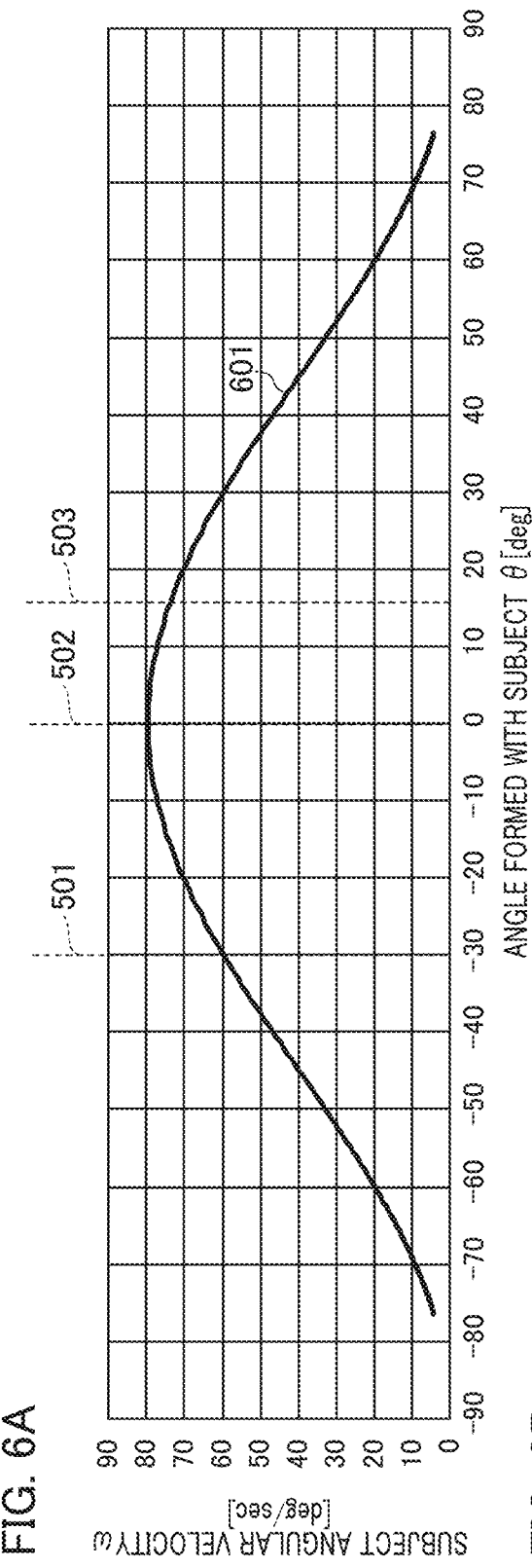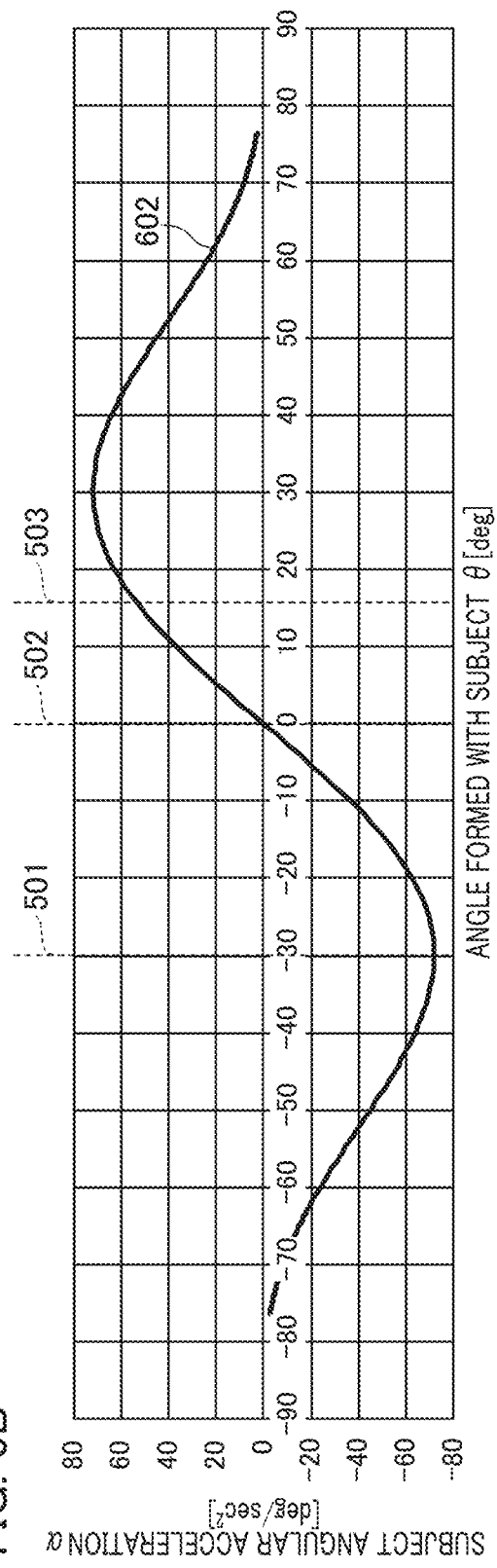

IMAGING DEVICE CONTROLLING CORRECTION OF SUBJECT BLUR AND CONTROL METHOD FOR IMAGING DEVICE

BACKGROUND OF THE DISCLOSURE

Field of the Disclosure

The aspect of the embodiments relates to an imaging device and a control method for the imaging device.

Description of the Related Art

Recent cameras have been equipped with a function called eye auto-focusing (which will be referred to as AF) by which the eyes of a person or an animal are detected and AF is performed thereon. As in portrait photos in which it is important to put the focus on the eyes accurately, there are positions that users want to focus on depending on compositions and scenes. In addition, blur is to be curbed at the positions that users want to focus on.

Types of blur that occurs in images will be briefly described. There are two types of blur including camera shake that is caused by shaking of hands or bodies, and subject blur that is caused by moving subjects. In subject blur among the types of blur, an amount of blur of a subject varies depending on positions of the same subject. For this reason, in a case in which subject blur is corrected, any one spot of the same subject is determined to be corrected. Thus, a mechanism that enables a position at which subject blur is to be corrected to be displayed on a user interface to notify the photographer of the position is needed. Japanese Patent Laid-Open No. 2018-180336 discloses a method for displaying subject blur by using display of a position of a distance measurement point frame for AF of an imaging optical system. According to Japanese Patent Laid-Open No. 2018-180336, a vector frame of a position at which subject blur is corrected is determined from detected vector information, and when driving is performed at a shutter speed set to the vector value of the determined vector frame, the display content is changed to whether the amount of drive falls within the driving area of the optical correction system.

However, the position at which the camera automatically corrects subject blur does not match the subject blur correction position expected by the photographer at all times.

SUMMARY OF THE DISCLOSURE

An imaging device includes a first detection unit that detects a subject, a second detection unit that detects a subject in a method different from a method in which the first detection unit detects a subject, a display unit that displays a candidate for a correction position at which subject blur is corrected based on each of a detection result of the first detection unit and a detection result of the second detection unit, and a control unit that controls correction of the subject blur based on a correction position specified from among the candidates.

Further features of the disclosure will become apparent from the following description of exemplary embodiments with reference to the attached drawings.

BRIEF DESCRIPTION OF THE DRAWINGS

FIGS. 6A and 6B are diagrams for describing a relationship between angles between the imaging device and subjects and subject angular velocities and a relationship between the angles and subject angular accelerations.

DESCRIPTION OF THE EMBODIMENTS

Figure 1:
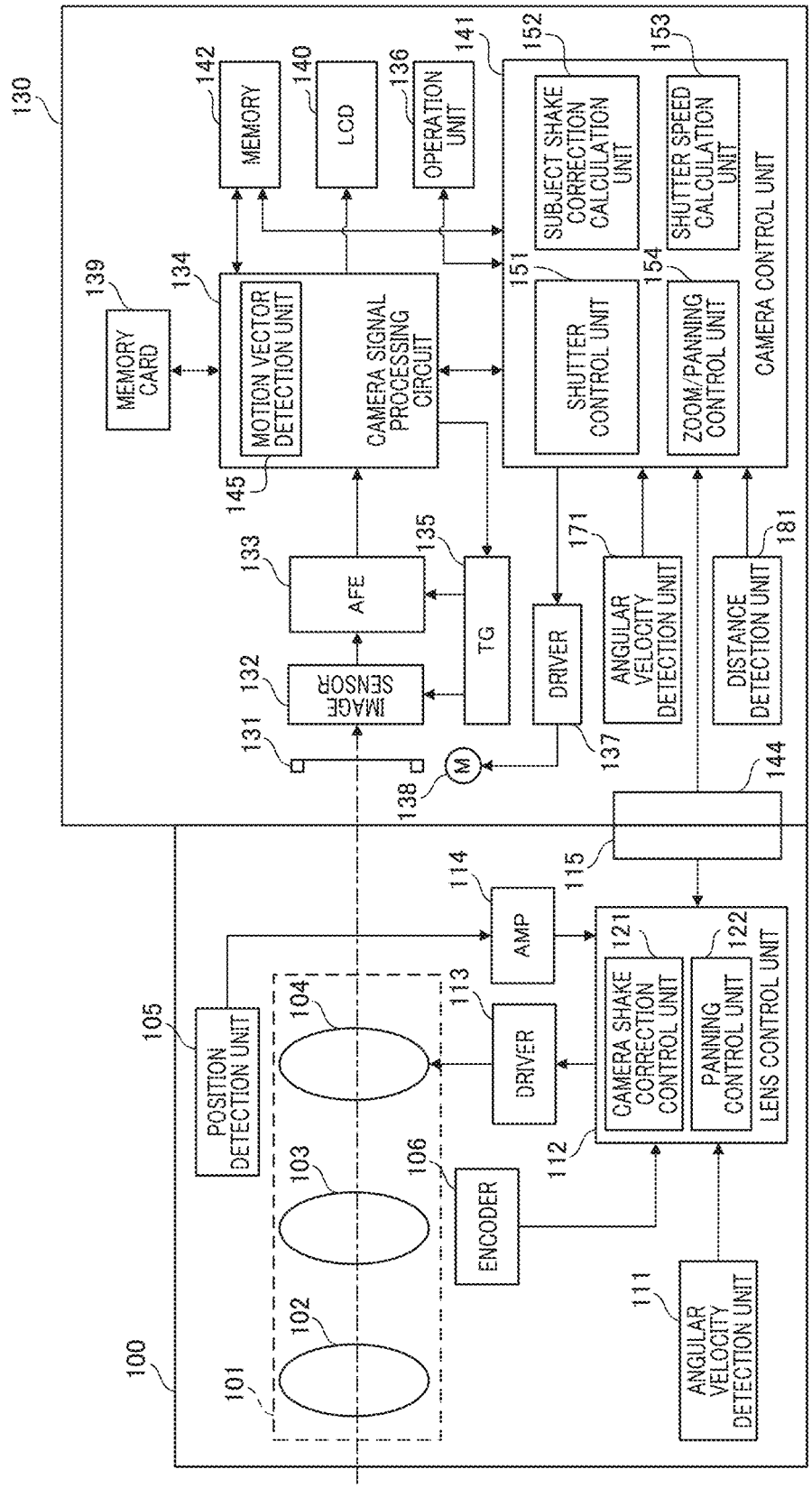
FIG. 1 is a diagram illustrating a configuration of an imaging device.

A configuration of an imaging device according to the present embodiment will be described with reference to FIG. 1. FIG. 1 is a diagram illustrating the configuration of the imaging device. The imaging device has a camera body 130 and an interchangeable lens 100 that is a lens device. The interchangeable lens 100 is detachable from the camera body 130. Further, although an example of an interchangeable lens-type imaging device in which the interchangeable lens 100 is detachable from the camera body 130 is described in the present embodiment, the imaging device is not limited thereto, and a lens-integrated imaging device in which a lens is integrated with a camera body may be adopted.

First, a configuration of the interchangeable lens 100 will be described. The interchangeable lens 100 has a photographing lens unit 101, a position detection unit 105, an encoder 106, an angular velocity detection unit 111, a lens control unit 112, a driver 113, an amplifier circuit (AMP) 114, and a mount contact point unit 115.

The photographing lens unit 101 has an imaging optical system 102, a zoom lens group (which will be described as a zoom lens) 103, and a shift lens group (which will be described as a shift lens) 104. The imaging optical system 102 guides subject light to an image sensor 132 via the zoom lens 103 and the shift lens 104. The zoom lens 103 is a lens group that can change focal distances. The shift lens 104 is a correction means used to optically correct blur of a captured image (image blur) caused by shaking imposed on the imaging device. Specifically, image blur is corrected when the lens control unit 112 controls the driver 113 such that the shift lens 104 is driven in a direction perpendicular to the optical axis.

The position detection unit 105 detects a position of the shift lens 104. The position detection unit 105 is, for example, a Hall element. The encoder 106 is a zoom encoder that detects a position of the zoom lens 103. In addition, the angular velocity detection unit 111 detects shaking imposed on the imaging device and outputs an angular velocity signal as a shaking detection signal. The angular velocity detection unit 111 is, for example, a gyro sensor.

In addition, the driver 113 drives the shift lens 104. The amplifier circuit 114 amplifies a signal indicating a position of the shift lens 104 detected by the position detection unit 105 (a position detection signal) and outputs the signal to the lens control unit 112. The mount contact point unit 115 relays communication between the interchangeable lens 100 and the camera body 130.

In addition, the lens control unit 112 controls the entire interchangeable lens 100. The lens control unit 112 is, for example, a central processing unit (CPU). The lens control unit 112 has a camera shake correction control unit 121 and a panning control unit 122. The camera shake correction control unit 121 executes camera shake correction control that is control of correcting image blur caused by shaking of the camera. The panning control unit 122 executes control of panning assist. The control of panning assist is control to correct, using a correction optical system, image blur of a subject (subject blur) caused by a deviation between a motion of the subject and a photographing direction of the imaging device at the time of panning Although the shift lens 104 is used as the correction optical system in the present embodiment, the image sensor may be used as the correction optical system. The panning control unit 122 uses a subject angular velocity calculated by a camera control unit 141 to calculate a drive amount of the shift lens 104 to be used in correction of subject blur.

Although the lens control unit 112 performs focus lens control, aperture control, and the like as well as the camera shake correction control and panning assist control, description thereof is omitted to simplify the drawing. In addition, to execute the camera shake correction control, for example, shaking with respect to two orthogonal axes, like shaking in the vertical direction and the horizontal direction, is to be detected and corrected, and a configuration for processing with respect to one axis is similar to a configuration for processing with respect to the other axis. Thus, a configuration with respect to one axis will be described below.

Next, a configuration of the camera body 130 will be described. The camera body 130 includes a shutter 131, an image sensor 132, an analog signal processing circuit (AFE) 133, and a camera signal processing circuit 134. The shutter 131 adjusts an amount of light to be received by the image sensor 132. The image sensor 132 is, for example, a CMOS sensor or the like, and photoelectrically converts subject light to output a signal of a captured image. "CMOS" is an abbreviation for "complementary metal oxide semiconductor." The AFE 133 converts an analog signal output by the image sensor 132 to a digital signal and outputs the digital signal to the camera signal processing circuit 134. The camera signal processing circuit 134 executes predetermined processing on the signal output by the AFE 133. The camera signal processing circuit 134 includes a motion vector detection unit 145 that detects a motion vector from the captured image. The motion vector detection unit 145 detects an amount of motions of an image in different frames acquired from the image sensor 132 as a motion vector. Further, in the present embodiment, a mirrorless camera is assumed, but it can also be applied to a single-lens reflex camera with a reflex mirror. In a single-lens reflex camera, the motion vector detection unit 145 may detect a motion vector from a video signal of a photometric sensor.

The camera body 130 also includes a timing generator (TG) 135, an operation unit 136, a memory card 139, and a display panel (which will be described as an LCD) 140. "LCD" 140 is an abbreviation for "liquid crystal display." The TG 135 sets an operation timing of the image sensor 132 and the AFE 133. The operation unit 136 receives input of a user operation. The operation unit 136 has a power source switch, a release switch, and the like. The memory card 139 has photographed videos (captured images) recorded thereon. The LCD 140 displays captured images, various kinds of information, and the like. The LCD 140 also has a touch panel function that enables touch operations using the electrostatic method, pressure sensitive method, or the like and receives user operations.

The camera body 130 also includes a driver 137, a shutter drive motor 138, an angular velocity detection unit 171, a distance detection unit 181, a mount contact point unit 144, a camera control unit 141, and a memory 142. The driver 137 drives the shutter drive motor 138. The shutter drive motor 138 drives the shutter 131. The angular velocity detection unit 171 detects a shake imposed on the imaging device and outputs an angular velocity signal (shake detection signal) to the camera control unit 141. The distance detection unit 181 detects a distance to a subject. The mount contact point unit 144 relays communication between the camera body 130 and the interchangeable lens 100. The memory 142 temporarily stores image data in addition to various setting information, arithmetic operation information, and the like.

The camera control unit 141 includes a CPU and controls the entire camera body 130. For example, the camera control unit 141 calculates an angular velocity of a subject (subject angular velocity) to be used to correct image blur based on a motion vector acquired from a captured image by controlling the camera signal processing circuit 134. In addition, the camera control unit 141 communicates various kinds of information (e.g., information of a subject angular velocity for control of panning assist, etc.) with the lens control unit 112 of the interchangeable lens 100 via the mount contact point unit 115 and the mount contact point unit 144.

The camera control unit 141 includes a shutter control unit 151, a subject shake correction calculation unit 152, a shutter speed calculation unit 153, and a zoom/panning control unit 154. The shutter control unit 151 instructs the driver 137 to control a shutter operation. The subject shake correction calculation unit 152 calculates a subject angular shake as an amount of blur correction of a subject. The subject shake correction calculation unit 152 transmits the calculated subject angular velocity to the lens control unit 112. Specifically, because the motion vector detection unit 145 detects an amount of motion of an image as a motion vector, the subject shake correction calculation unit 152 reliably detects a vector corresponding to the subject (subject vector) from the detected motion vector. Then, the subject shake correction calculation unit 152 calculates a subject angular velocity based on the detected subject vector. The camera control unit 141 transmits the calculated subject angular velocity to the lens control unit 112. The shutter speed calculation unit 153 calculates a shutter speed suitable for panning. The zoom/panning control unit 154 controls a zoom position such that a subject reflected in a photographing angle of view is reflected in a certain size in each frame.

As described above, the imaging device according to the present embodiment includes the image blur correction device that corrects image blur by driving the shift lens 104 that is a correction means in the direction orthogonal to the optical axis. In addition, the camera control unit 141 and the lens control unit 112 function as control means that corrects image blur that occurs in a subject at the time of panning by driving the shift lens 104 based on a subject angular velocity obtained from a captured image. The camera control unit 141 and the lens control unit 112 drive the shift lens 104 based on a subject angular velocity calculated based on a correction position of a subject blur.

In FIG. 1, when the power of the camera body 130 is turned on by the operation unit 136, the camera control unit 141 detects the power-on, and power supply and initial setting with respect to each circuit of the camera body 130 are performed under control of the camera control unit 141. In addition, power is supplied to the interchangeable lens 100 and an initial setting of the interchangeable lens 100 is performed under control of the lens control unit 112. Then, the lens control unit 112 and the camera control unit 141 start communication at a predetermined timing. Communication data transmitted from the camera body 130 to the interchangeable lens 100 is, for example, a state of the camera, a photographing setting, and the like. Communication data transmitted from the interchangeable lens 100 to the camera body 130 is, for example, focal distance information of the lens, angular velocity information, and the like.

Figure 2:
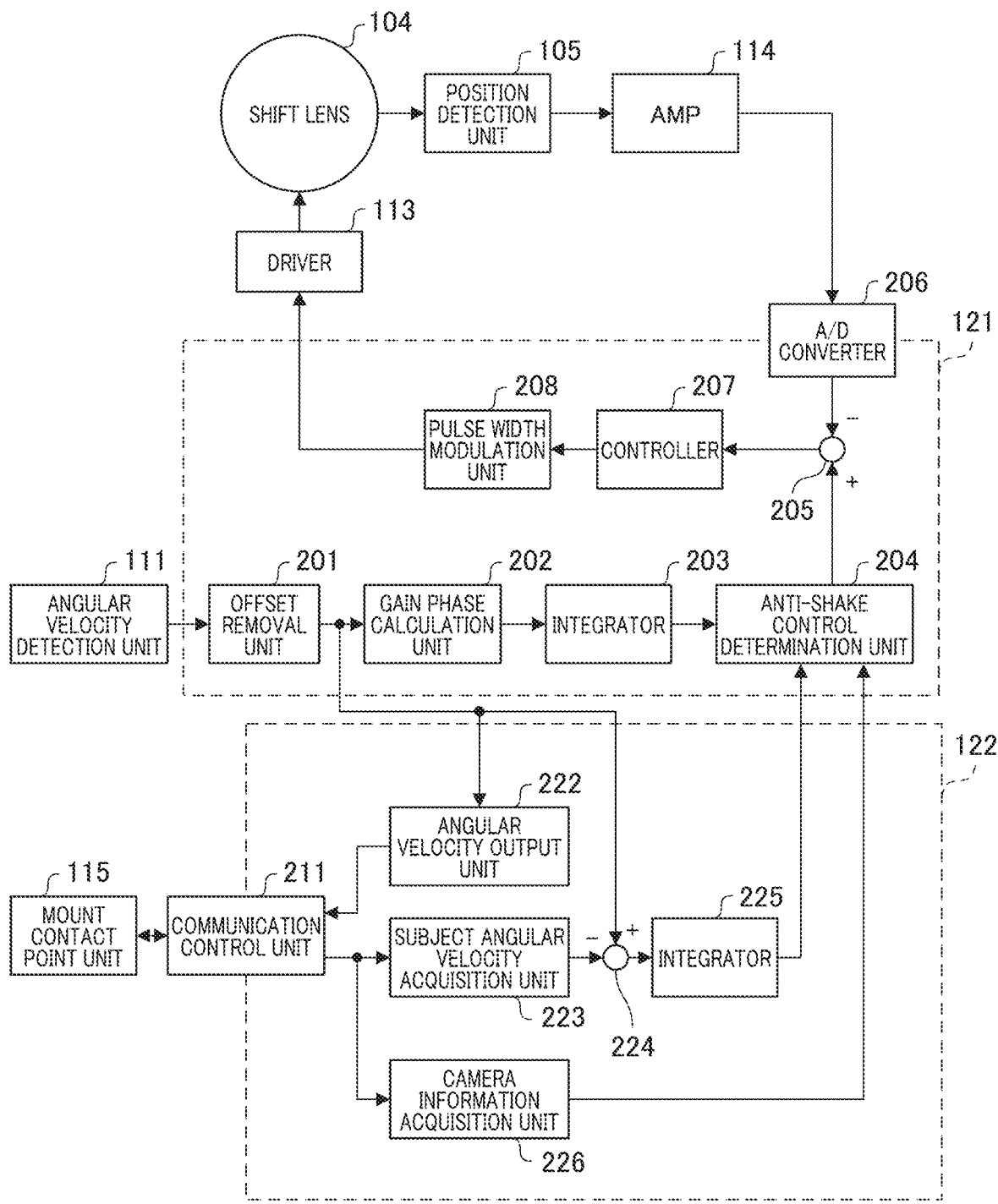
FIG. 2 is a diagram illustrating an example of a configuration of camera shake correction control.

FIG. 2 is a diagram illustrating an example of a configuration of camera shake correction control. In the interchangeable lens 100, the angular velocity detection unit 111 detects a shake imposed on the imaging device due to a camera shake, or the like and the camera shake correction control unit 121 performs camera shake correction control. Further, in the description for FIG. 2, the same reference numerals are given to the configurations common for FIG. 1, and description thereof will be omitted.

The camera shake correction control unit 121 includes an offset removal unit 201 to a pulse width modulation unit 208. The offset removal unit 201 is a filter calculation unit with a high-pass filter (which will be referred to as an HPF below), or the like, for example, and removes DC components included in output of the angular velocity detection unit 111. A gain phase calculation unit 202 performs amplification and phase compensation on an angular velocity signal from which offset components have been removed by the offset removal unit 201. For that reason, the gain phase calculation unit 202 includes an amplifier that amplifies the angular velocity signal from which offset components have been removed with a predetermined gain and a phase compensating filter that performs phase compensation on the angular velocity signal.

An integrator 203 has a function of changing characteristics of any frequency band in that band, integrates output of the gain phase calculation unit 202, and calculates an amount of drive of the shift lens 104. The integrator 203 determines that panning is being performed if a predetermined period of time has elapsed with an angular velocity of the angular velocity detection unit 111 in a magnitude equal to or greater than a certain value, and gradually changes a cutoff frequency of the HPF of the offset removal unit 201 to the high frequency side. When the integrator 203 gradually changes the cutoff frequency to the high frequency side, a target signal of camera shake correction control becomes gradually smaller, and the correction optical system (the shift lens) is returned at an optical center position. If the correction optical system corrects an angular velocity that is high enough for determining that panning is being performed, without changing the cutoff frequency to the high frequency side, the correction optical system reaches a correction limit point, and the photographer sees an unnatural change in the angle of view.

An anti-shake control determination unit 204 acquires output of each of the integrator 203 and another integrator 225, which will be described below, and outputs either to a subtractor 205. The anti-shake control determination unit 204 switches a signal for driving the shift lens 104 according to output of a camera information acquisition unit 226 as follows. In a case in which a photographing mode is set to a panning assist mode, for example, the anti-shake control determination unit 204 selects output of the integrator 225 calculated by the panning control unit 122. On the other hand, in a case in which a photographing mode is set to a mode other than the panning assist mode, the anti-shake control determination unit 204 selects output of the integrator 203 calculated by the camera shake correction control unit 121.

The position detection unit 105 detects a position of the shift lens 104 and the amplifier circuit 114 amplifies a position detection signal. An analog (A)/digital (D) converter 206 digitize the position detection signal amplified by the amplifier circuit 114 and outputs the result to the subtractor 205.

The subtractor 205 performs subtraction with the output of the anti-shake control determination unit 204 as positive input and the output of the A/D converter 206 as negative input, and outputs deviation data that is the subtraction result to a controller 207. The controller 207 includes an amplifier that amplifies the deviation data output by the subtractor 205 with a predetermined gain, and a phase compensating filter. The deviation data is processed by the amplifier and the phase compensating filter in the controller 207 and output to the pulse width modulation unit 208. The pulse width modulation unit 208 acquires the output data of the controller 207, modulates the data in a waveform to change the duty ratio of pulse waves (i.e., PWM waveform), and outputs the modulated data to the driver 113 for driving the shift lens.

The driver 113 is, for example, a voice coil motor that drives the shift lens 104. The driver 113 moves the shift lens 104 in a direction perpendicular to the optical axis of the imaging optical system according to the output of the pulse width modulation unit 208.

Here, control in the panning assist mode and a configuration of the panning control unit 122 will be described. When a user performs an operation to set to the panning assist mode using the operation unit 136, the camera control unit 141 switches to control of panning assist. In addition, information indicating the switching is transmitted from the camera control unit 141 to the lens control unit 112, and the lens control unit 112 switches to control of panning assist.

A camera information acquisition unit 226 acquires various types of camera information transmitted from the camera control unit 141 via a communication control unit 211. The camera information includes setting information and release information of the panning assist mode, or the like. The camera information acquisition unit 226 outputs information for a determination process to the anti-shake control determination unit 204.

An angular velocity output unit 222 acquires output of the offset removal unit 201, that is, an angular velocity signal from which offset components have been removed. The angular velocity output unit 222 transmits an angular velocity signal to the camera control unit 141 via the communication control unit 211 and the mount contact point unit 115. A subject angular velocity acquisition unit 223 acquires a subject angular velocity calculated by the subject shake correction calculation unit 152 inside the camera body 130 via the mount contact point units 144 and 115 and the communication control unit 211. Then, the subject angular velocity acquisition unit 223 outputs a subject angular velocity to be used in calculation of an amount of drive of the shift lens 104 when subject blur is corrected based on the acquired subject angular velocity.

A subtractor 224 performs subtraction with the output of the offset removal unit 201 as positive input and the output of the subject angular velocity acquisition unit 223 as negative input. A deviation is calculated by subtracting the angular velocity indicated by the angular velocity signal from which offset components have been removed from the subject angular velocity output by the subject angular velocity acquisition unit 223. The subtractor 224 outputs the deviation to the integrator 225. The integrator 225 integrates deviations and outputs the result of the integral operation to the anti-shake control determination unit 204.

Figure 3:
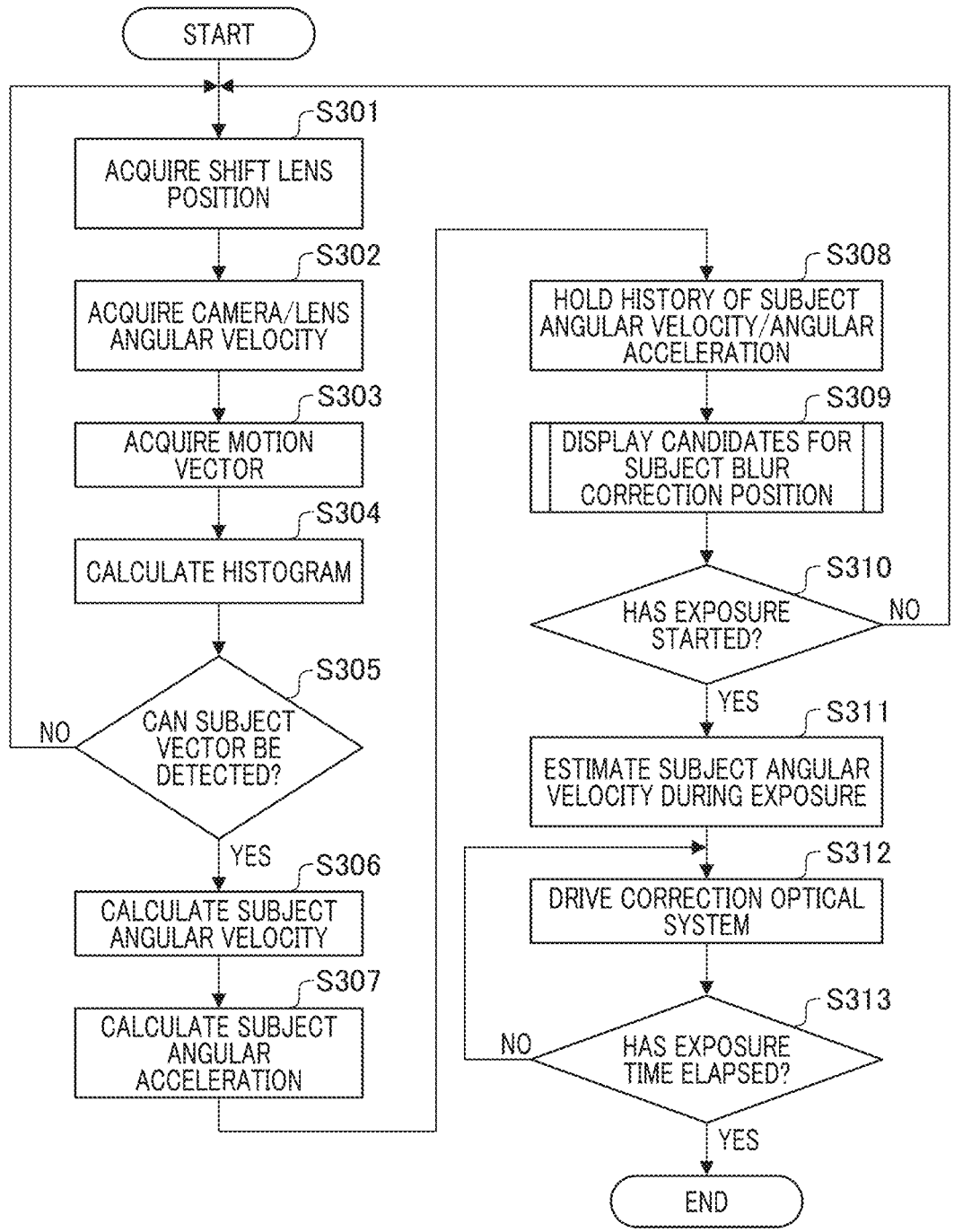
FIG. 3 is an overall flowchart of panning control.

A method for controlling subject blur correction will be described using the flowchart of FIG. 3. FIG. 3 is the flowchart explaining an example of subject blur correction performed as control of panning assist.

In step S301, the camera control unit 141 acquires position information of the shift lens 104 inside the interchangeable lens 100. A vector value $\delta v$ detected by the motion vector detection unit 145 is the value obtained by adding the value obtained by converting an angular velocity of the imaging device into the displacement amount $\delta g$ on the imaging surface to the value obtained by converting an amount of drive of the shift lens 104 into the displacement amount $\delta o$ on the imaging surface ($\delta v = \delta g + \delta o$).

In step S302, the camera control unit 141 acquires angular velocity information output by the angular velocity detection unit 111 inside the interchangeable lens 100 and the angular velocity detection unit 171 inside the camera body 130. Then, the camera control unit 141 converts the angular velocity [deg/sec] indicated by the angular velocity information into an amount of displacement on the imaging surface [pixel/frame] using a focal distance [mm], a frame rate [frame/sec], and a pixel pitch [um/pixel].

In step S303, the motion vector detection unit 145 detects a motion vector indicated by an amount of motions of an image in a plurality of frames. In step S304, the camera control unit 141 calculates a histogram for the motion vector based on the information acquired in step S301 to step S303. Details of the histogram will be described below.

In step S305, the camera control unit 141 determines whether a subject vector has been detected based on the histogram calculated in step S304. If a subject vector has been detected, the process proceeds to step S306. On the other hand, if a subject vector has not been detected, the process proceeds to step S301, and the next frame gets ready for being processed.

Figure 4:
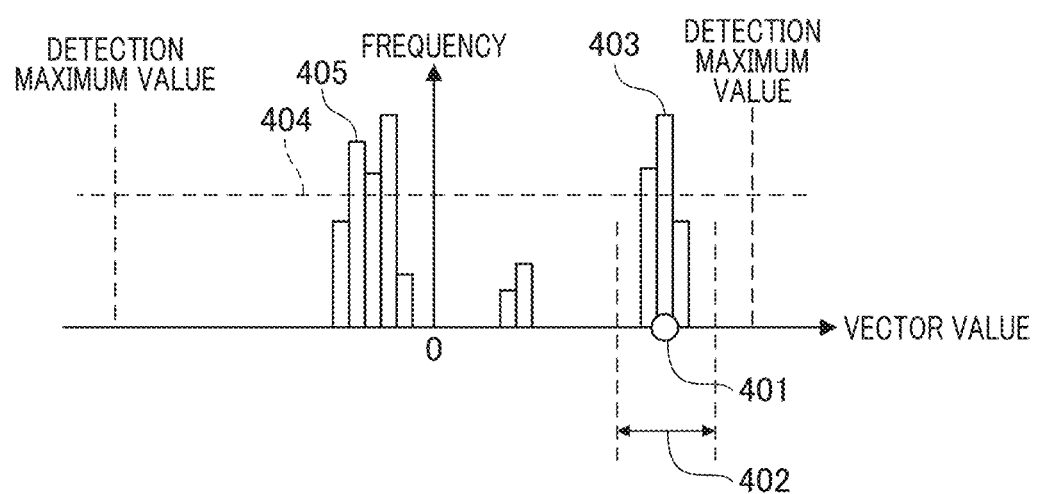
FIG. 4 is a diagram for describing a subject vector detection method.

Here, a method for determining detection of a subject vector will be described using FIG. 4. FIG. 4 is a diagram for describing detection of a subject vector. The detection of the subject vector is determined using the histogram calculated in step S304. The histogram illustrated in FIG. 4 is an example of the histogram calculated in step S304 of FIG. 3. The horizontal axis represents vector values. The vertical axis represents frequencies.

The motion vector detection unit 145 detects, as a vector value, an amount of motions of the one previous frame in each block in a vector detection frame disposed at a predetermined position. The camera control unit 141 calculates a histogram of the vector value detected by the motion vector detection unit 145. The motion vector detection unit 145 does not have a function of classifying each of detected blocks into a subject vector or a background vector. Thus, the camera control unit 141 determines based on the histogram that a motion vector that starts from angular velocity information 401, converted into the displacement amount $\delta g$ on the imaging surface, and is present in a background range 402 as a background vector group 403. The camera control unit 141 determines a motion vector that is present outside the background range 402 and has a frequency exceeding a predetermined threshold value 404 as a subject vector 405. Further, in the background range 402, a length (a width of a vector value regarded as a background range) may be variable according to a focal distance or accuracy in detection of a motion factor by the motion vector detection unit 145.

In addition, the camera control unit 141 may determine whether a subject vector has been detected as follows. That is, the camera control unit 141 may determine a vector present in an area with a depth difference in a predetermined range from a defocus amount of a focusing frame based on a defocus amount obtained in a focus adjustment process (defocusing), instead of an angular velocity signal. Then, the camera control unit 141 may determine a vector present outside the area of the depth difference of the predetermined region as a background vector group. In addition, the camera control unit 141 may determine a subject vector and a background vector group using both the defocus amount and the angular velocity signal.

FIG. 3 will be described again.

In step S306, the camera control unit 141 calculates a subject angular velocity to be used in calculation of an amount of drive of the shift lens 104 for correction of subject blur. Specifically, the camera control unit 141 selects a subject vector to be used in correction of subject blur among subject vectors 405 detected in step S305. The reason for this is that a vector value varies (an amount of subject blur varies) depending on a position in a subject.

For example, when a photographer pans a train being in linear motion, the front side and the rear side of the train have different vector values. If the imaging device is moved along with a subject at the same speed, that is, the imaging device is moved in parallel with the subject, without changing the photographing direction of the imaging device, the front side and the rear side of the subject have an equal vector value. However, in actual panning, a photographer does not move the imaging device in parallel with a subject, but moves the imaging device while changing the angle. Thus, the front side and the rear side of a subject have different vectors when the subject is viewed from the imaging device. As a focal distance has a wider angle and a photographing distance becomes shorter, the front side and the rear side of a subject have more remarkably different vectors. On the contrary, if a photographing distance is infinitely long, the photographing case is equivalent to photographing in parallel with a subject, and thus the entire subject often seems to be stopping. In order to correct blur at one point of the subject in the correction of the subject blur, a subject vector to be used in control is finally selected from the subject vectors 405 and converted into a subject angular velocity in step S306.

In step S307, the camera control unit 141 obtains the difference between the subject angular velocity calculated in step S306 and the subject angular velocity of one previous frame to calculate a subject angular acceleration.

Figure 5:
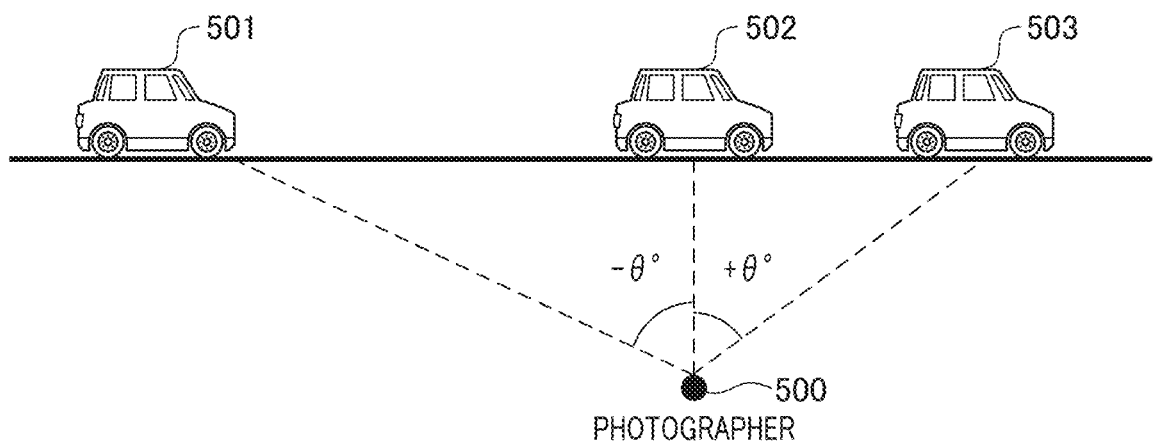
FIG. 5 is a diagram for describing angles between an imaging device and subjects.

Here, a subject angular velocity and a subject angular acceleration viewed from a photographer will be described using FIGS. 5 to 6B. FIG. 5 is a diagram for describing angles between the imaging device (a photographer 500) and subjects according to movement states of the subjects. FIG. 6A is a diagram showing a relationship between angles between the imaging device and the subjects and subject angular velocities. FIG. 6B is a diagram showing a relationship between angles between the imaging device and the subjects and subject angular accelerations.

If a speed of a subject is set as v [m/s] and a distance to the subject is set as L [m], an angle $\theta$ [deg] between the subject and the photographer 500 is expressed by the following equation 1.

$$\theta = \tan^{-1}\left(\frac{vt}{L}\right) \quad (1)$$

Here, because an angular velocity ω [deg/sec] is indicated by the first-order derivative of the angle θ, it is expressed by the following equation 2.

$$\omega = \frac{d\theta}{dt} = \frac{Lv}{L^2 + (vt)^2} \quad (2)$$

Further, because an angular acceleration a [deg/sec$^2$] is indicated by the first-order derivative of the angular velocity ω, it is expressed by the following equation 3.

$$\alpha = \frac{d\omega}{dt} = -\frac{2Lv^3 t}{\{L^2 + (vt)^2\}^2} \quad (3)$$

Thus, FIG. 5 illustrates the angles θ formed by the subjects viewed from the camera expressed by the equation 1. FIGS. 6A and 6B show the relationships between the angles θ formed by the subjects and the subject angular velocity ω and the subject angular acceleration a indicated by the equations 2 and 3. A subject angular velocity 601 shown in FIG. 6A is the subject angular velocity calculated in step S306. A subject angular acceleration 602 shown in FIG. 6B is the subject angular acceleration calculated in step S307.

FIG. 3 will be described again.

In step S308, the camera control unit 141 instructs the memory 142 to hold a history of the subject angular velocity and subject angular acceleration calculated for each frame. The history of the subject angular velocity and subject angular acceleration is used to estimate a subject angular velocity during an exposure period in step S311, which will be described below. The reason for estimating a subject angular velocity during an exposure period is that an evaluation image to be used for detection of a motion vector is not acquired during the exposure period and a motion vector that serves as the base of the calculation of the subject angular velocity and subject angular acceleration is not detected.

Figure 7:
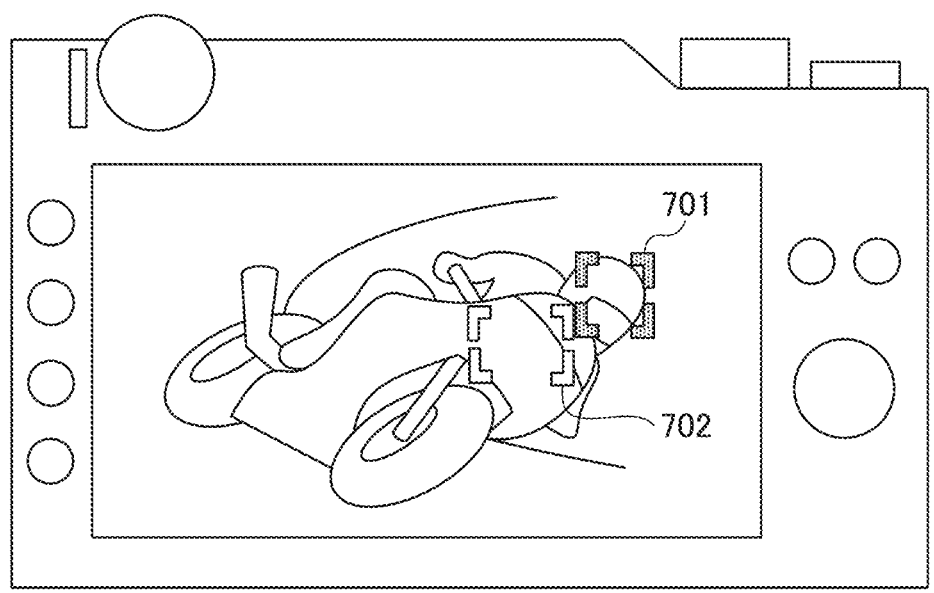
FIG. 7 is a diagram illustrating an example of display of candidates for a subject blur correction position.

In step S309, the camera control unit 141 instructs the LCD 140 to display candidates for the subject blur correction position. The display of candidates for the subject blur correction position will be described in detail using FIGS. 7 and 8. FIG. 7 is a diagram illustrating an example of display of a user interface for a subject blur correction position. In step S309, frames (a frame 701 and a frame 702) indicating position information serving as candidates for the subject blur correction position are overlapped on a live-view image and displayed as illustrated in FIG. 7. Further, although the example in which position information of candidates for the subject blur correction position is expressed using frames has been described in the present embodiment, the disclosure is not limited thereto, and an expression method does not matter as long as it enables users to recognize a position listed as a candidate at which subject blur correction is performed.

Figure 8:
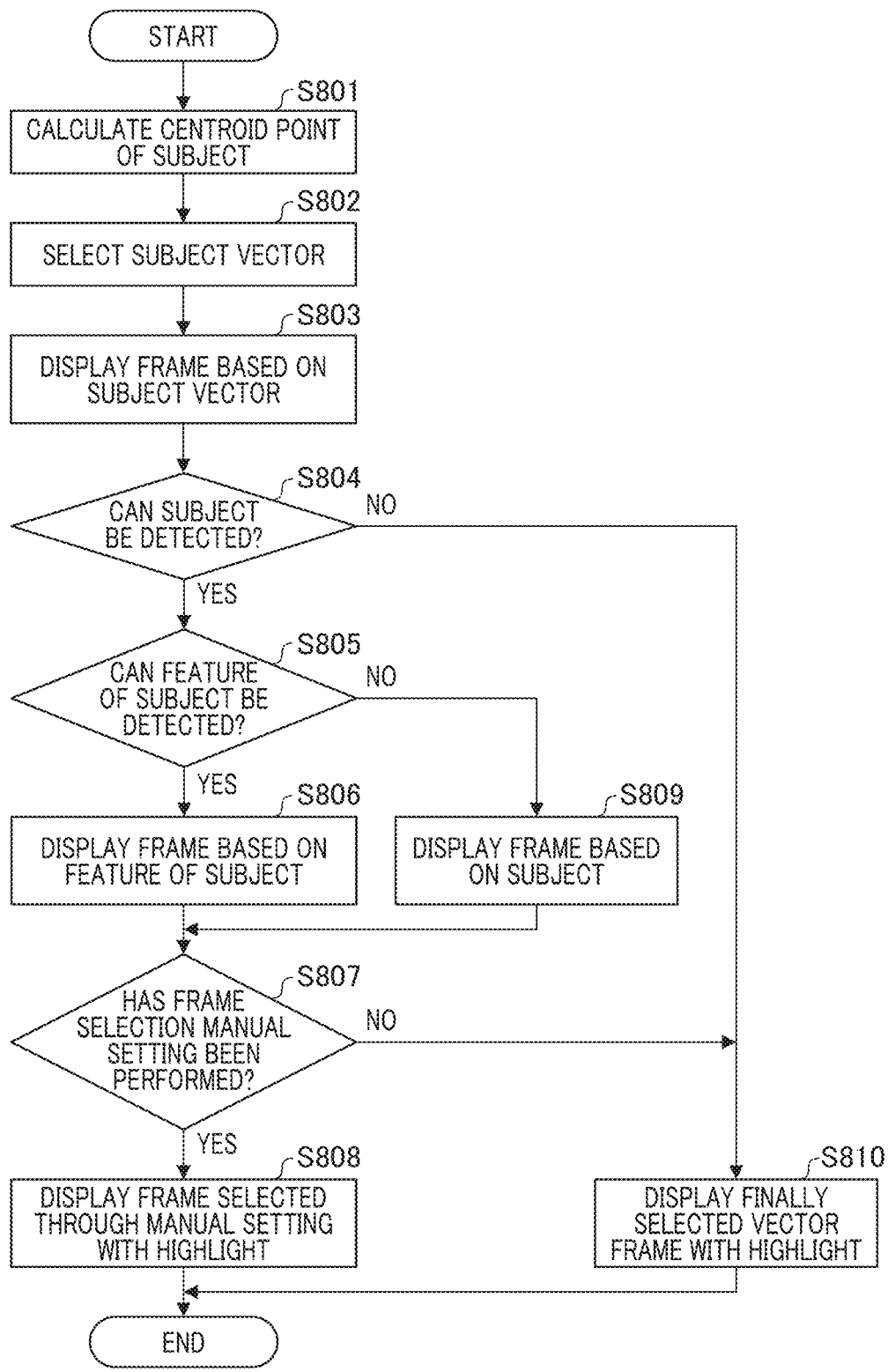
FIG. 8 is a flowchart of display of a subject blur correction position.

FIG. 8 is a flowchart showing a process of displaying candidates for a subject blur correction position.

Figure 9:
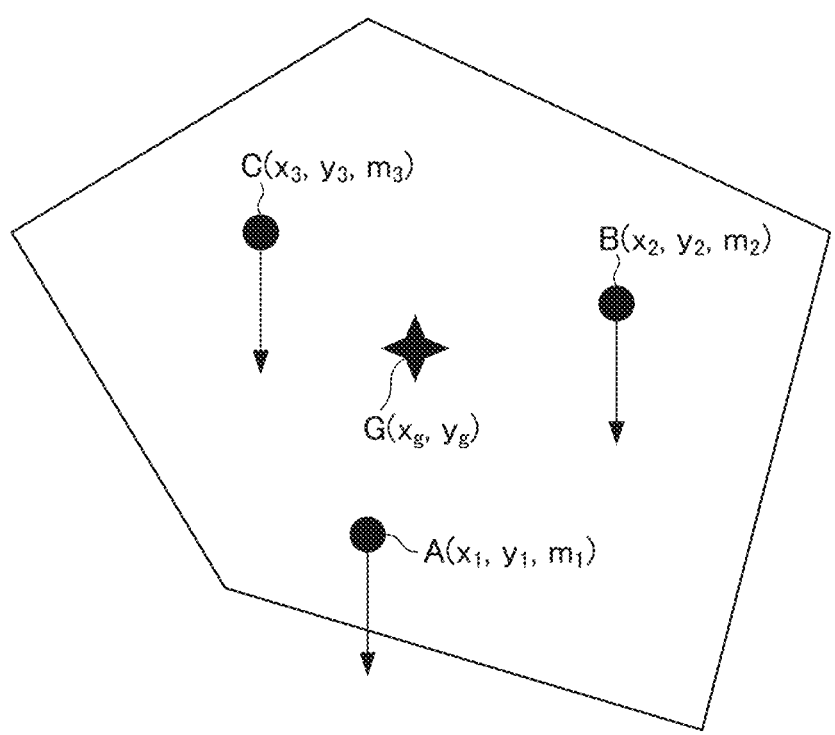
FIG. 9 is a diagram for describing calculation of a centroid point.

In step S801, the camera control unit 141 calculates a centroid point G of a subject. Here, the calculation of the centroid point G will be described using FIG. 9. FIG. 9 is a diagram for describing calculation of a centroid point. If the coordinates of a point A are set as $(x_1, y_1)$, the coordinates of a point B as $(x_2, y_2)$, the coordinates of a point C as $(x_3, y_3)$, the mass at the point A as $m_1$, the mass at the point B as $m_2$, and the mass at the point C as $m_3$, the coordinates of the centroid point G $(x_g, y_g)$ are expressed by the following equation 4.

$$x_g = \frac{x_1 m_1 + x_2 m_2 + x_3 m_3}{m_1 + m_2 + m_3}, \quad y_g = \frac{y_1 m_1 + y_2 m_2 + y_3 m_3}{m_1 + m_2 + m_3} \quad (4)$$

Here, if the masses at all of the points on an image are assumed to be equal, the centroid point G on the image can be calculated by the following equation 5. The camera control unit 141 calculates the coordinates of the centroid point G $(x_g, y_g)$ of the subject from the center coordinates $(x_n, y_n)$ of each vector frame at which a vector determined to be a subject vector has been detected.

$$x_g = \frac{\sum_{i=0}^{N} x_N}{N}, \quad y_g = \frac{\sum_{i=0}^{N} y_N}{N} \quad (5)$$

FIG. 8 will be described again.

In step S802, the camera control unit 141 determines a subject blur correction position from the centroid point of the subject calculated in step S801. At this time, the camera control unit 141 determines the subject blur correction position based on a composition from the centroid point of the subject, subject information, or the like.

Figure 10B:
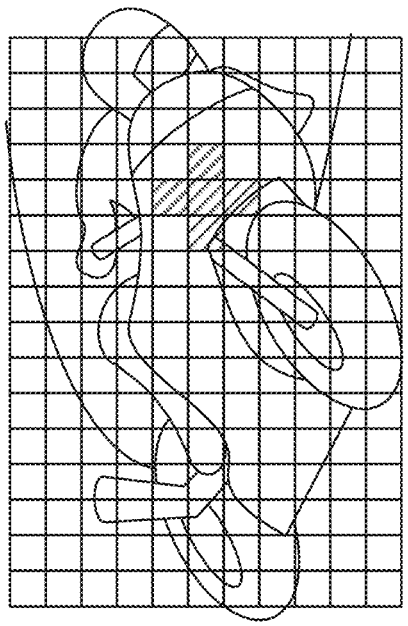
FIGS. 10A and 10B are diagrams for describing a subject blur correction position based on a centroid point of a subject.
Figure 10A:
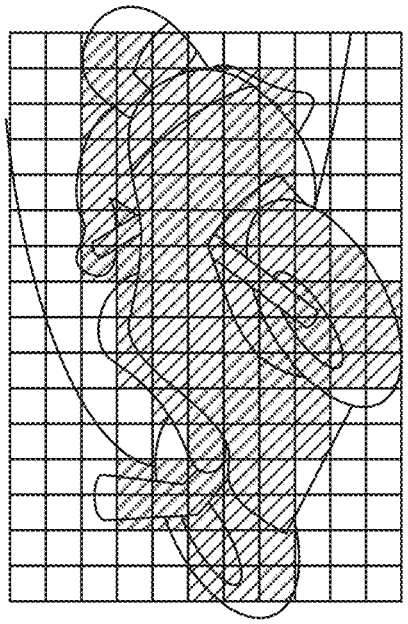

The method for determining a subject blur correction position from the centroid point of a subject will be described using FIGS. 10A and 10B. FIGS. 10A and 10B are diagrams for describing a subject blur correction position based on the centroid point of a subject. FIG. 10A is a diagram illustrating a subject area. The subject area is an area in which the subject vectors are detected in step S305. As described using FIG. 4, the camera control unit 141 separates the subject vectors and background vector from the detected vector values and detects the subject vectors. The area indicated by the diagonal lines in FIG. 10A is a subject area.

FIG. 10B is a diagram illustrating a subject blur correction position based on the centroid point of the subject. The camera control unit 141 calculates the centroid point G of the subject area from the center coordinates of each vector frame in which a vector determined as a subject vector has been detected, that is, the center coordinates of each vector frame in the subject area. Then, the camera control unit 141 determines a subject blur correction position based on a composition from the centroid point G or subject information. The subject information to be used for determining the subject blur correction position includes a subject movement direction, a subject movement speed, an angle θ formed with the subject, and the like.

In a case in which the subject is moving in the upper-right direction of the screen, for example, the vector frame in the upper-right direction is set as a subject blur correction position from the centroid point G $(x_g, y_g)$ in the subject movement direction. In addition, in a specific composition, a vector frame at a predetermined position from the centroid point G $(x_g, y_g)$ may be set as a subject blur correction position. In a case in which an approaching motorbike is being photographed, if the angle θ formed with the subject expressed by the equation 1 has a high value, the motorbike is being photographed in the composition in which it is viewed from the front side. Thus, the vector frame at the position above the centroid point G in the traveling direction is set as a subject blur correction position so that the subject blur correction position is near a front side of the motorbike.

In step S803, the camera control unit 141 instructs the LCD 140 to display the frame indicating the subject blur correction position determined in step S802 from the centroid point of the subject.

In step S804, the camera control unit 141 determines whether a subject can be detected. If a subject can be detected, the process proceeds to step S805. On the other hand, if no subject can be detected, the process proceeds to step S812. Here, the detection of a subject in the present step is performed using any method other than that of the detection of a subject using a motion vector in step S305. For example, a subject may be detected through comparison of subject model information (a pattern) registered in advance (pattern matching) or may be detected using a detection learning model (a machine learning result). In addition, a subject may be detected using a method based on a histogram of color information such as hues or saturation of an image or luminance information, or may be detected using distance information to the subject. In addition, the number of subjects to be detected is not limited to one, and multiple subjects may be detected.

In step S805, it is determined whether a feature of the subject detected in step S804 can be detected. Multiple features of the subject may be detected. If a feature can be detected, the process proceeds to step S805. On the other hand, if a feature is not detected, the process proceeds to step S809.

In a scene of motorsports, for example, features of a subject include a helmet, a front light of a motorbike, and the like, and in a case in which a subject is a person or an animal, features of the subject include the face, the eyes, and the like. Any method for detection of a feature of a subject may be adopted. For example, a feature may be detected through comparison of feature point model information (a pattern) registered in advance (pattern matching) or may be detected using a detection learning model (a machine learning result).

In step S806, the camera control unit 141 instructs the LCD 140 to display a frame indicating the subject blur correction position based on the site of the feature of the subject determined in step S805.

In step S809, the camera control unit 141 instructs the LCD 140 to display a frame for the entire subject.

In step S807, it is determined whether a frame selection manual setting has been performed by a user. When a frame had been specified by the user, it is assumed that the frame selection manual setting has been performed, and the process proceeds to step S808. On the other hand, when a frame had not been specified by the user, it is assumed that the frame selection manual setting has not been performed, and the process proceeds to step S810.

Here, an example of the frame selection manual setting by the user will be described using FIG. 7. The frame 702 is a frame indicating the subject blur correction position based on the centroid point of the subject vector displayed in step S803. The frame 701 is a frame indicating the subject blur correction position based on the feature of the subject displayed in step S806. A motorbike has three main features such as the bike, the rider, and the helmet. In the present embodiment, an example in which the helmet is detected as a feature of the subject is introduced.

The user manually specifies a frame position at which he or she wants to correct subject blur from among multiple displayed frames. The frame may be specified by, for example, touching the frame displayed on the LCD 140 that is a touch panel, or operating a joystick or a button of the operation unit 136.

In step S808, the camera control unit 141 instructs the LCD 140 to display the frame selected by the user in step S807 with highlights stronger than other frames. Here, examples of display with highlights include changing the color of the frame, causing the frame to flicker, and the like. Further, in the present embodiment, the frame indicating the subject blur correction candidate position based on the centroid point of the subject displayed in step S803 is displayed with highlights until the user selects the frame.

If a subject is not detected in step S804, or if the frame selection manual setting is not performed in step S807, the process proceeds to step S810. In step S810, the camera control unit 141 instructs the LCD 140 to display, with highlights, the subject blur correction position based on the centroid point of the area in which the subject vector has been detected.

As described above, in the present embodiment, candidates for the subject blur correction position are displayed on the image, and the user can specify one position from the candidates. The candidates for the subject blur correction position include a correction position from the centroid point of the area in which the subject vector has been detected (a correction position based on a detection result of a first detection means) and a correction position based on a feature of the subject (a correction position based on a detection result of a second detection means). Further, although the example in which the subject blur correction position based on the centroid point of the subject vector, the position at which a feature of the subject is detected, or a position of the entire subject is displayed as a candidate for the subject blur correction position has been described in the present embodiment, the disclosure is not limited thereto. For example, a position specified by a user in advance may be included in the candidates.

FIG. 3 will be described again.

In step S310, the camera control unit 141 determines whether the photographer has pressed the release button to give an instruction of start of exposure. If the instruction of start of exposure has been given, the process proceeds to step S311. If the instruction of start of exposure has not been given, the process returns to step S301.

In step S311, the lens control unit 112 calculates (estimates) a subject angular velocity during the exposure period. Specifically, first, the camera control unit 141 transmits the subject angular velocity and subject angular acceleration before exposure according to the subject blur correction position determined in step S309 to the lens control unit 112 of the interchangeable lens 100. The subject angular velocity and subject angular acceleration before exposure transmitted to the lens control unit 112 are the history of the subject angular velocity and subject angular acceleration calculated in step S306 and step S307 and held in the memory 142 in step S308. The lens control unit 112 calculates a subject angular velocity during the exposure period based on the subject angular velocity and subject angular acceleration at the subject blur correction position received from the camera control unit 141. Further, for a subject angular velocity calculated on the interchangeable lens side, a subject angular velocity is calculated by estimating a motion of the subject during the exposure period also in consideration of the release time lag from pressing of the release button to the start of exposure.

In step S312, the lens control unit 112 drives the shift lens 104 that is the correction optical system that optically corrects a shake based on the subject angular velocity calculated in step S311. Due to the operation, the subject blur at the subject blur correction position selected by the user is corrected. In addition, the lens control unit 112 drives the zoom lens 103 to focus on the subject blur correction position selected by the user.

In step S313, the camera control unit 141 determines whether a predetermined period of exposure time has elapsed. If the exposure time has elapsed, the process ends. Then, after development is completed, the process described with reference to FIG. 3 starts from the next frame. On the other hand, if the exposure period has not elapsed, the process returns to step S312, and the shift lens 104 is continuously driven until the exposure time elapses.

Further, although the present embodiment is based on the assumption of a mirrorless camera that does not have a reflex mirror, the disclosure can also be applied to single-lens reflex cameras. It is needless to say that a difference from a mirrorless camera is that equivalent control is possible if a video signal of a photometric sensor is input, rather than inputting a video signal to be input to the motion vector detection unit 145 to the image sensor 132. In addition, although the example in which subject blur is corrected by driving the shift lens 104 has been described in the present embodiment, a correction method is not limited thereto, and for example, subject blur may be optically corrected by driving the image sensor inside the camera body 130. In addition, a frame indicating a candidate for a position at which subject blur is corrected and a frame indicating a position that is an AF target may be displayed on the LCD 140 so that the user can recognize each of the subject blur correction position and the AF target position. At this time, the user can easily recognize each of the frame indicating the candidate for the subject blur correction position and the frame indicating the AF target position if display modes (size, form, color, or the like) of the frames are set to be different. Furthermore, in a case in which the frame indicating the candidate for the subject blur correction position overlaps the frame indicating the AF target position, the display modes of the frames may be different from a case in which the frames do not overlap.

According to the present embodiment, a plurality of candidates for a subject blur correction position are displayed and a user can select a correction position from the candidates as described above, and thus subject blur correction can be performed at the correction position instructed by the user. As a result, it is possible to provide an imaging device that enables subject blur to be corrected at a subject blur correction position expected by a photographer.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-065610, filed Apr. 1, 2020, which is hereby incorporated by reference wherein in its entirety.

What is claimed is:
1. A device comprising:
at least one processor; and
a memory coupled to the at least one processor, the memory having instructions that, when executed by the processor, perform operations as:
  a first detection unit configured to detect a first subject;
  a second detection unit configured to detect a second subject in a method different from a method in which the first detection unit detects the first subject, the first subject and the second subject being the same or different from each other;
  a display unit configured to display a candidate for a correction position at which subject blur is corrected based on each of a detection result of the first detection unit and a detection result of the second detection unit and
  a control unit configured to control correction of the subject blur based on a correction position specified from among the candidates by driving a correction optical unit in a direction perpendicular to an optical axis of the correction optical unit.

2. The device according to claim 1, wherein the first detection unit detects the first subject based on a motion vector.

3. The device according to claim 1, wherein the display unit calculates a centroid point of the first subject detected by the first detection unit and displays a candidate for a correction position at which subject blur is corrected based on the centroid point.

4. The device according to claim 3, wherein the display unit determines and displays the correction position based on any one of the centroid point, a subject movement direction, an angle formed by the subject and the device, and a composition of an image.

5. The device according to claim 1, wherein the second detection unit detects the second subject based on any one of color information of an image, luminance information, information of a distance to the subject, pattern matching, and a machine learning result.

6. The device according to claim 5, wherein the second detection unit detects a feature of the detected second subject.

7. The device according to claim 6, wherein the second detection unit detects the feature of the second subject based on any one of pattern matching and a machine learning result.

8. The device according to claim 6, wherein, if the second detection unit has detected the feature of the second subject, the display unit displays a position corresponding to the feature as a candidate for a correction position at which subject blur is corrected, and if the second detection unit has not detected a feature of the second subject, the display unit displays a position corresponding to the second subject detected by the second detection unit as a candidate for a correction position at which subject blur is corrected.

9. The device according to claim 1, wherein the display unit displays the candidate for the correction position specified by a user with highlights when a plurality of candidates for the correction position are displayed.

10. The device according to claim 1, wherein the display unit displays the correction position with highlights based on the detection result of the first detection unit until a user specifies a correction position when a plurality of candidates for the correction position are displayed.

11. The device according to claim 1, wherein the control unit corrects subject blur at the correction position based on the detection result of the first detection unit when a user does not specify the correction position.

12. The device according to claim 1, wherein the control unit corrects the subject blur by driving the correction optical unit based on a subject angular velocity calculated for the specified correction position of the subject blur.

13. A method comprising:
a first detection process of detecting a first subject;
a second detection process of detecting a second subject in a method different from a method of the first detection process, the first subject and the second subject being the same or different from each other;
a display process of displaying a candidate for a correction position at which subject blur is corrected based on each of a detection result of the first detection process and a detection result of the second detection process; and
a control process of controlling correction of the subject blur based on a correction position specified from among the candidates by driving a correction optical unit in a direction perpendicular to an optical axis of the correction optical unit.

14. The method according to claim 13, further comprising detecting the first subject based on a motion vector.

15. The method according to claim 13, further comprising calculating a centroid point of the detected subject and displaying a candidate for a correction position at which subject blur is corrected based on the centroid point.

16. The method according to claim 13, further comprising detecting the second subject based on any one of color information of an image, luminance information, information of a distance to the second subject, pattern matching, and a machine learning result.

17. The method according to claim 13, further comprising displaying the candidate for the correction position specified by a user with highlights when a plurality of candidates for the correction position are displayed.

18. The method according to claim 13, further comprising displaying the correction position with highlights based on the detection result until a user specifies a correction position when a plurality of candidates for the correction position are displayed.

19. The method according to claim 13, further comprising correcting subject blur at the correction position based on the detection result when a user does not specify the correction position.

20. The method according to claim 13, further comprising correcting the subject blur by driving a correction unit based on a subject angular velocity calculated for the specified correction position of the subject blur.

* * * * *